(12) United States Patent
Hatakeyama

(10) Patent No.: US 9,424,629 B2
(45) Date of Patent: Aug. 23, 2016

(54) IMAGE PICKUP APPARATUS, IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Koshi Hatakeyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/652,942

(22) PCT Filed: Jan. 27, 2014

(86) PCT No.: PCT/JP2014/052363
§ 371 (c)(1),
(2) Date: Jun. 17, 2015

(87) PCT Pub. No.: WO2014/119768
PCT Pub. Date: Aug. 7, 2014

(65) Prior Publication Data
US 2016/0005151 A1    Jan. 7, 2016

(30) Foreign Application Priority Data

Feb. 1, 2013   (JP) ................................. 2013-018300
Feb. 1, 2013   (JP) ................................. 2013-018331

(51) Int. Cl.
*G06T 5/00*         (2006.01)
*G06T 7/00*         (2006.01)
(Continued)

(52) U.S. Cl.
CPC ................. *G06T 5/001* (2013.01); *G06T 5/003* (2013.01); *G06T 5/20* (2013.01); *G06T 7/004* (2013.01); *H04N 5/357* (2013.01); *H04N 5/3572* (2013.01)

(58) Field of Classification Search
None
See application file for complete search history.

(56) References Cited

U.S. PATENT DOCUMENTS 8,872,962 B2    10/2014   Fukuda
2010/0157094 A1  6/2010   Takamiya
(Continued)

FOREIGN PATENT DOCUMENTS

JP    2010087672 A    4/2010
JP    2011135563 A    7/2011
(Continued)

OTHER PUBLICATIONS

Written Opinion issued in PCT/JP2014/052363, dated Apr. 8, 2014.
(Continued)

*Primary Examiner* — Shahbaz Nazrul
(74) *Attorney, Agent, or Firm* — Rossi, Kimms & McDowell LLP

(57) ABSTRACT

An image pickup apparatus includes an image pickup element which obtains an original image, a storage unit which stores a first optical transfer function different depending on an image pickup condition and on a position in the original image and an image restoration filter or a function designed to generate a second optical transfer function, a data obtaining unit which obtains the first optical transfer function when the aperture value is less than a predetermined value, and the image restoration filter or the second optical transfer function generated based on the function designed to generate the second optical transfer function when the aperture value is not less than the predetermined value, a filter generating unit which generates an image restoration filter based on the first or second optical transfer function, and an image processing unit which generates the restored image by using the image restoration filter.

14 Claims, 7 Drawing Sheets

(51) Int. Cl.
*H04N 5/357* (2011.01)
*G06T 5/20* (2006.01)

(56) References Cited

U.S. PATENT DOCUMENTS

| | | | |
|---|---|---|---|
| 2011/0128422 A1 | 6/2011 | Nagata | |
| 2011/0187874 A1* | 8/2011 | Kikuchi | G06T 5/006 348/207.1 |
| 2011/0193997 A1 | 8/2011 | Hatakeyama | |
| 2011/0285879 A1* | 11/2011 | Hatakeyama | G06T 5/003 348/241 |
| 2011/0292257 A1* | 12/2011 | Hatakeyama | H04N 1/58 348/242 |
| 2012/0162485 A1* | 6/2012 | Okada | H04N 1/4092 348/241 |
| 2013/0050540 A1* | 2/2013 | Kano | H04N 9/045 348/241 |
| 2014/0218557 A1* | 8/2014 | Ebe | H04N 5/2351 348/222.1 |
| 2015/0334359 A1* | 11/2015 | Hayashi | G06T 5/003 348/242 |
| 2016/0027155 A1* | 1/2016 | Naruse | H04N 1/409 382/167 |
| 2016/0063683 A1* | 3/2016 | Watanabe | H04N 5/91 382/260 |

FOREIGN PATENT DOCUMENTS

| | | |
|---|---|---|
| JP | 2012073691 A | 4/2012 |
| JP | 2014007493 A | 1/2014 |
| WO | 2012018102 A1 | 2/2012 |

OTHER PUBLICATIONS

International Search Report issued in PCT/JP2014/052363, dated Apr. 8, 2014.

Extended European Search Report issued in European Appln. No. 14745522.4 with mailbox date of Jul. 5, 2016.

\* cited by examiner

IMAGE PICKUP APPARATUS, IMAGE PROCESSING APPARATUS, IMAGE PROCESSING METHOD, AND NON-TRANSITORY COMPUTER-READABLE STORAGE MEDIUM

TECHNICAL FIELD

The present invention relates to an image pickup apparatus and an image processing apparatus which are capable of generating a restored image from an original image.

BACKGROUND ART

An original image obtained by an image pickup apparatus is deteriorated due to an image blurring component contained therein which is caused by adverse effects that occur in an image pickup optical system. These adverse effects include various types of aberrations, such as spherical aberration, coma aberration, curvature of field, and astigmatism, and light diffraction. The presence of such an image blurring component caused by these types of aberrations means that when a light beam emitted from one point does not suffer from any aberration or diffraction, the light beam fails to converge to another point, being minutely spread around the another point. Such a minutely-spread distribution is represented by point spread function (PSF).

An optical transfer function (an OTF) obtained by the Fourier transform of a PSF is frequency component information on an aberration and represented by a complex number. The absolute value of an OTF, i.e., an amplitude component, is referred to as a "modulation transfer function" (an MTF), and a phase component is referred to as a "phase transfer function" (a PTF), respectively. A modulation component MTF and a phase component PTF are an amplitude component of image deterioration caused by an aberration, and frequency characteristics of a phase component, respectively, and represented by the following expression with the phase component being defined as a phase angle.

$$PTF = \tan^{-1}(Im(OTF)/Re(OTF))$$

In this expression, symbols Re (OTF) and Im (OTF) represent the real part and the imaginary part of an OTF, respectively. As described above, because an OTF of an image pickup optical system deteriorates an amplitude component and a phase component of an image, each point of an object is, as seen in the case of a coma aberration, asymmetrically blurring in the deteriorated image. A chromatic aberration of magnification occurs in a situation in which a position where an image is formed is shifted due to a difference in the formation ratio depending on each light wave length and the formed image is obtained as an RGB color component, for example, according to spectral characteristics of the image pickup apparatus. This means that imaging positions of R, G, and B components are shifted to each other, leading to an imaging position shift in each color component depending on a wavelength, that is, a spread of an image due to a phase shift.

As a method of correcting a deterioration of an amplitude component MTF and a phase component PTF, the correction with the use of information on an OTF of the image pickup optical system is known. This method is generally called image restoration or image reconstruction. Accordingly, processing in which a deteriorated shot image is corrected by using information on an OTF of the image pickup optical system is hereinafter referred to as "image restoration processing". As one of the image restoration methods, the method of convoluting an image restoration filter with reverse characteristics of an optical transfer function (OTF) with respect to an input image, which is described later, is known.

The effective use of a restored image requires obtaining more accurate information on an OTF of the image pickup optical system. An OTF of a typical image pickup optical system is greatly different depending on an image height (a position in an image). Moreover, since an OTF is two-dimensional data represented by a complex number, the OTF has real and imaginary parts. When the image restoration processing is to be performed for a colored image which includes three color components, that is, red (R), green (G), and blue (B), OTF data with a single image height is represented by the following expression: tap number in a vertical direction×tap number in a horizontal direction×2 (real part/imaginary part)×3 (RGB). In this expression, "tap number" means vertical and horizontal sizes of the OTF data. The retention of these tap numbers for all items of an image pickup condition including an image height, an F number (an aperture value), a zoom (a focal length), and an object distance results in a massive data volume. In order to change restoration characteristics depending on a position in an image, it is desirable to perform the image restoration processing not in a frequency space in a batch manner, but in a real space while switching a restoration filter.

One cause for image blurring is a diffraction phenomenon of light dependent on an F number of the image pickup optical system. In FIG. 9, which illustrates a diffraction limit curve, the horizontal axis and the vertical axis indicate a spatial frequency and a MTF, respectively. As illustrated in FIG. 9, the darker color the F number indicates, to the lower frequency side the cutoff frequency is shifted. For instance, the Nyquist frequency of an image pickup element with a pixel size of 4 μm is 125 lines/mm. Accordingly, when an F number, for example F2.8, indicates a bright color, the degree of adverse effects caused by such a diffraction phenomenon is small. By contrast, when an F number, for example F16 or F32, indicates a dark color, the degree of such adverse effects is large. Since a diffraction phenomenon can be represented by an OTF or a PSF as in the case of an aberration, the image restoration processing described above can correct a blurring due to diffraction.

PTL 1 discloses a method of performing the image restoration processing according to various image pickup conditions of an image pickup apparatus while retaining an OTF for use in image restoration which is converted to a coefficient.

CITATION LIST

Patent Literature

[PTL 1] Japanese Patent Laid-open No. 2012-73691

SUMMARY OF INVENTION

Technical Problem

However, an OTF is different depending on an aperture value, an object distance, and a focal length of a zoom lens. Furthermore, an OTF is different depending also on an image height in a screen. These facts lead to a considerably large volume of the entire high-definition OTF data.

Similarly, the image restoration processing performed for a single image entails a large computation volume. This is because an OTF which is adjusted depending on each image height is used. The method disclosed in PTL 1 reduces data volume by retaining an OTF for use in image restoration which is converted to a coefficient. However, further reduction in amounts of data and calculation is required since they affect a calculation speed of an image processing circuit of the image pickup apparatus and a cost for a memory of the image pickup apparatus.

Thus, the present invention provides an image pickup apparatus, an image processing apparatus, an image processing method, and a non-transitory computer-readable storage medium which are capable of performing highly-accurate image restoration processing while reducing amounts of data and calculation.

Solution to Problem

An image pickup apparatus as one aspect of the present invention is capable of generating a restored image from an original image, and includes an image pickup element configured to photoelectrically convert an object image formed via an image pickup optical system to obtain the original image, a storage unit configured to store a first optical transfer function which is different depending on an image pickup condition and on a position in the original image and an image restoration filter whose distribution of two-dimensional filter values is constant with respect to a position in the original image and different depending on an aperture value or a function designed to generate a second optical transfer function, a data obtaining unit configured to obtain the first optical transfer function when the aperture value is less than a predetermined value, and obtain the image restoration filter or the second optical transfer function generated based on the function designed to generate the second optical transfer function when the aperture value is not less than the predetermined value, a filter generating unit configured to generate an image restoration filter based on the first optical transfer function or the second optical transfer function when the data obtaining unit obtains the first optical transfer function or the second optical transfer function, and an image processing unit configured to generate the restored image from the original image by using the image restoration filter stored in the storage unit or the image restoration filter generated by the filter generating unit.

An image processing apparatus as another aspect of the present invention is capable of generating a restored image from an original image, and includes an obtaining unit configured to obtain the original image and an image pickup condition of the original image, a storage unit configured to store a first optical transfer function which is different depending on an image pickup condition and on a position in the original image and an image restoration filter whose distribution of two-dimensional filter values is constant with respect to a position in the original image and different depending on an aperture value or a function designed to generate a second optical transfer function, a data obtaining unit configured to obtain the first optical transfer function when the aperture value is less than a predetermined value, and obtain the image restoration filter or the second optical transfer function generated based on the function designed to generate the second optical transfer function when the aperture value is not less than the predetermined value, a filter generating unit configured to generate an image restoration filter based on the first optical transfer function or the second optical transfer function when the data obtaining unit obtains the first optical transfer function or the second optical transfer function, and an image processing unit configured to generate the restored image from the original image by using the image restoration filter stored in the storage unit or the image restoration filter generated by the filter generating unit.

An image processing method as another aspect of the present invention is a method of generating a restored image from an original image, and includes the steps of obtaining the original image and an image pickup condition of the original image, obtaining a first optical transfer function from a storage unit, the storage unit storing the first optical transfer function which is different depending on the image pickup condition and on a position in the original image to be used when an aperture value of the image pickup condition is less than a predetermined value, and the storage unit storing an image restoration filter whose distribution of two-dimensional filter values is constant with respect to a position in the original image and different depending on the aperture value or a function designed to generate a second optical transfer function to be used when the aperture value is not less than the predetermined value, obtaining, from the storage unit, the image restoration filter or the second optical transfer function generated based on the function designed to generate the second optical transfer function when the aperture value is not less than the predetermined value, generating an image restoration filter based on the first optical transfer function or the second optical transfer function when a data obtaining unit obtains the first optical transfer function or the second optical transfer function, and generating the restored image from the original image by using the image restoration filter stored in the storage unit or the image restoration filter generated by a filter generating unit.

A non-transitory computer-readable storage medium as another aspect of the present invention stores an image processing program to generate a restored image from an original image, and the image processing program is configured to cause an information processing apparatus to execute the steps of obtaining the original image and an image pickup condition of the original image, obtaining a first optical transfer function from a storage unit, the storage unit storing the first optical transfer function which is different depending on the image pickup condition and on a position in the original image to be used when an aperture value of the image pickup condition is less than a predetermined value, and the storage unit storing an image restoration filter whose distribution of two-dimensional filter values is constant with respect to a position in the original image and different depending on the aperture value or a function designed to generate a second optical transfer function to be used when the aperture value is not less than the predetermined value, obtaining, from the storage unit, the image restoration filter or the second optical transfer function generated based on the function designed to generate the second optical transfer function when the aperture value is not less than a predetermined value, generating an image restoration filter based on the first optical transfer function or the second optical transfer function when a data obtaining unit obtains the first optical transfer function or the second optical transfer function, and generating the restored image from the original image by using the image restoration filter stored in the storage unit or the image restoration filter generated by a filter generating unit.

An image pickup apparatus as another aspect of the present invention is capable of generating a restored image from an original image, and includes an image pickup element configured to photoelectrically convert an object image formed via an image pickup optical system to obtain the original image, a storage unit configured to store a plurality of image restoration filters whose distribution of two-dimensional filter values is different depending on an aperture value, a determining unit configured to determine whether an aperture value which is set when the original image is shot is not less than a predetermined value, and an image processing unit configured to select an image restoration filter depending on the aperture value from the image restoration filters to generate the restored image from the original image by using the selected image restoration filter when the aperture value is not less than the predetermined value.

An image processing apparatus as another aspect of the present invention is capable of generating a restored image from an original image, and includes an obtaining unit configured to obtain the original image and an aperture value which is set when the original image is shot, a storage unit configured to store a plurality of image restoration filters whose distribution of two-dimensional filter values is different depending on an aperture value, a determining unit configured to determine whether the aperture value which is set when the original image is shot is not less than a predetermined value, and an image processing unit configured to select an image restoration filter depending on the aperture value from the image restoration filters when the aperture value is not less than the predetermined value to generate the restored image from the original image by using the selected image restoration filter.

An image processing method as another aspect of the present invention is a method of generating a restored image from an original image, and includes the steps of obtaining the original image and an aperture value which is set when the original image is shot, determining whether the aperture value is not less than a predetermined value, and selecting, when the aperture value is not less than the predetermined value, an image restoration filter corresponding to the aperture value from a plurality of image restoration filters which are different depending on an aperture value and then generating the restored image from the original image by using the selected image restoration filter.

A non-transitory computer-readable storage medium as another aspect of the present invention stores an image processing program to generate a restored image from an original image, and the image processing program is configured to cause an information processing apparatus to execute the steps of obtaining the original image and an aperture value which is set when the original image is shot, determining whether the aperture value is not less than a predetermined value, selecting, when the aperture value is not less the predetermined value, an image restoration filter corresponding to the aperture value from a plurality of image restoration filters which are different depending on an aperture value, and generating the restored image from the original image by using the selected image restoration filter.

An image pickup apparatus as another aspect of the present invention is capable of generating a restored image by using an image restoration filter with respect to an original image, and includes an image pickup element configured to photoelectrically convert an object image formed via an image pickup optical system to obtain the original image, a determining unit configured to determine whether an aperture value which is set when the original image is shot is not less than a predetermined value, a storage unit configured to store a plurality of image restoration filters prepared corresponding to the aperture value, a selecting unit configured to select an image restoration filter corresponding to the aperture value from the image restoration filters when the aperture value which is set when the original image is shot is not less than the predetermined value, and an image processing unit configured to generate the restored image by using the selected image restoration filter with respect to a pixel value corresponding to each different image height.

An image pickup apparatus as another aspect of the present invention is capable of generating a restored image from an original image, and includes an image pickup element configured to photoelectrically convert an object image formed via an image pickup optical system to obtain the original image, a determining unit configured to determine whether an aperture value which is set when the original image is shot is not less than a predetermined value, and a storage unit configured to store a common image restoration filter serving as an image restoration filter to be calculated with respect to a first pixel value corresponding to a first image height in the object image in order to correct the first pixel value and as an image restoration filter to be calculated with respect to a second pixel value corresponding to a second image height in the object image in order to correct the second pixel value when the aperture value is not less than the predetermined value.

An image pickup apparatus as another aspect of the present invention is capable of generating a restored image from an original image, and includes an image pickup element configured to photoelectrically convert an object image formed via an image pickup optical system to obtain the original image, a determining unit configured to determine whether an aperture value which is set when the original image is shot is not less than a predetermined value, a restoration processing unit configured to restore the image restoration filter, and a storage unit configured to store the image restoration filter, and the restoration processing unit is configured to perform the restoration processing by using the image restoration filter stored in the storage unit only when the aperture value is not less the predetermined value.

An image pickup apparatus as another aspect of the present invention is capable of generating a restored image from an original image, and includes an obtaining unit configured to obtain the original image and an aperture value which is set when the original image is shot, a determining unit configured to determine whether the aperture value which is set when the original image is shot is not less than a predetermined value, and an image processing unit configured to generate the restored image from the original image by using an image restoration filter whose distribution of two-dimensional filter values is constant with respect to a position in the original image when the aperture value is not less than the predetermined value.

An image pickup apparatus as another aspect of the present invention is capable of generating a restored image from an original image, and includes an image pickup element configured to photoelectrically convert an object image formed via an image pickup optical system to obtain the original image, a determining unit configured to determine whether an aperture value which is set when the original image is shot is not less than a predetermined value, and an image processing unit configured to generate the restored image from the original image by using an image restoration filter common to a first image height and a second image height different from each other when the aperture value is not less than the predetermined value.

An image pickup apparatus as another aspect of the present invention is capable of generating a restored image from an original image, and includes an image pickup element configured to photoelectrically convert an object image formed via an image pickup optical system to obtain the original image, a determining unit configured to determine whether an aperture value which is set when the original image is shot is not less than a predetermined value, and an image processing unit configured to generate the restored image from the original image by using an image restoration filter which is different depending on an image pickup condition and on a position in the original image when the aperture value is less than the predetermined value, and generate the restored image from the original image by using an image restoration filter whose distribution of two-dimensional filter values is constant with respect to the position in the original image when the aperture value is not less than the predetermined value.

An image pickup apparatus as another aspect of the present invention is capable of generating a restored image from an original image, and includes an image pickup element configured to photoelectrically convert an object image formed via an image pickup optical system to obtain the original image, a determining unit configured to determine whether an aperture value which is set when the original image is shot is not less than a predetermined value, and an image processing unit configured to perform development processing excluding image restoration processing when the aperture value is less than the predetermined value, and generate the restored image from the original image by using an image restoration filter whose distribution of two-dimensional filter values is constant with respect to a position in the original image when the aperture value is not less than the predetermined value.

An image processing method as another aspect of the present invention is a method of generating a restored image from an original image, and includes the steps of obtaining the original image and an aperture value which is set when the original image is shot, determining whether the aperture value is not less than a predetermined value, and generating the restored image from the original image by using an image restoration filter whose distribution of two-dimensional filter values is constant with respect to a position in the original image when the aperture value is not less than the predetermined value.

An image processing method as another aspect of the present invention is a method of generating a restored image from an original image, and includes the steps of obtaining the original image and an aperture value which is set when the original image is shot, determining whether the aperture value is not less than a predetermined value, and generating the restored image from the original image by using an image restoration filter common to a first image height and a second image height different from each other when the aperture value is not less than the predetermined value.

An image processing method as another aspect of the present invention is a method of generating a restored image from an original image, and includes the steps of obtaining the original image and an image pickup condition of the original image, determining whether an aperture value of the image pickup condition is not less than a predetermined value, and generating the restored image from the original image by using an image restoration filter which is different depending on the image pickup condition and on a position in the original image when the aperture value is less than the predetermined value, and generating the restored image from the original image by using an image restoration filter whose distribution of two-dimensional filter values is constant with respect to the position in the original image when the aperture value is not less than the predetermined value.

An image processing method as another aspect of the present invention is a method of generating a restored image from an original image, and includes the steps of obtaining the original image and an image pickup condition of the original image, determining whether an aperture value of the image pickup condition is not less than a predetermined value, and performing development processing excluding image restoration processing when the aperture value is less than the predetermined value, and generating the restored image from the original image by using an image restoration filter whose distribution of two-dimensional filter values is constant with respect to a position in the original image when the aperture value is not less than the predetermined value.

A non-transitory computer-readable storage medium as another aspect of the present invention stores an image processing program to generate a restored image from an original image, and the image processing program is configured to cause an information processing apparatus to execute the steps of obtaining the original image and an aperture value which is set when the original image is shot, determining whether the aperture value is not less than a predetermined value, and generating the restored image from the original image by using an image restoration filter whose distribution of two-dimensional filter values is constant with respect to a position in the original image when the aperture value is not less than a predetermined value.

A non-transitory computer-readable storage medium as another aspect of the present invention stores an image processing program to generate a restored image from an original image, and the image processing program is configured to cause an information processing apparatus to execute the steps of obtaining the original image and an aperture value which is set when the original image is shot, determining whether the aperture value is not less than a predetermined value, and generating the restored image from the original image by using an image restoration filter common to a first image height and a second image height different from each other when the aperture value is not less than the predetermined value.

A non-transitory computer-readable storage medium as another aspect of the present invention stores an image processing program to generate a restored image from an original image, and the image processing program is configured to cause an information processing apparatus to execute the steps of obtaining the original image and an image pickup condition of the original image, determining whether an aperture value of the image pickup condition is not less than a predetermined value, and generating the restored image from the original image by using an image restoration filter which is different depending on the image pickup condition and on a position in the original image when the aperture value is less than the predetermined value, and generating the restored image from the original image by using an image restoration filter whose distribution of two-dimensional filter values is constant with respect to the position in the original image when the aperture value is not less than the predetermined value.

A non-transitory computer-readable storage medium as another aspect of the present invention stores an image processing program to generate a restored image from an original image, and the image processing program is configured to cause an information processing apparatus to execute the steps of obtaining the original image and an image pickup condition of the original image, determining whether an aperture value of the image pickup condition is not less than a predetermined value, and performing development processing excluding image restoration processing when the aperture value is less than the predetermined value, and generating the restored image from the original image by using an image restoration filter whose distribution of two-dimensional filter values is constant with respect to a position in the original image when the aperture value is not less than the predetermined value.

Further features and aspects of the present invention will become apparent from the following description of exemplary embodiments with reference to the attached drawings.

Advantageous Effects of Invention

The present invention provides an image pickup apparatus, an image processing apparatus, an image processing method, and a non-transitory computer-readable storage medium which are capable of performing highly-accurate image restoration processing while reducing data volume and computation volume.

DESCRIPTION OF EMBODIMENTS

Figure 1:
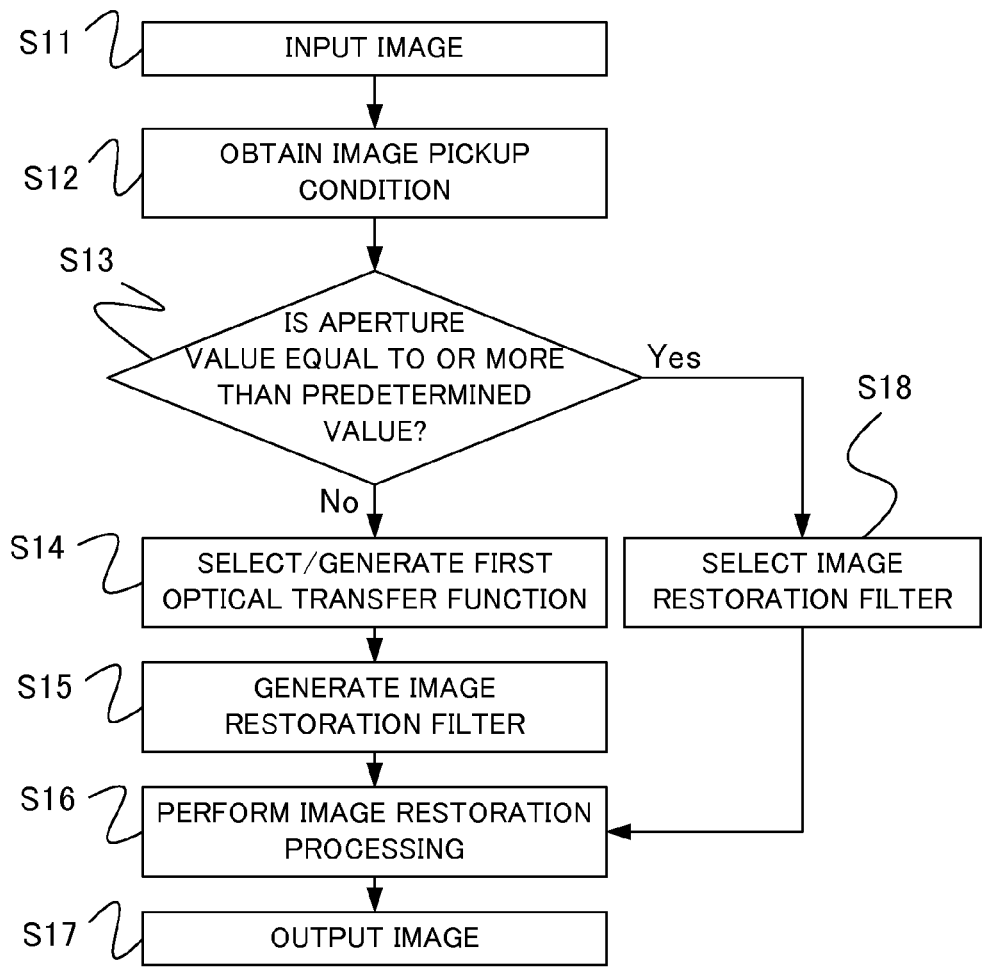
FIG. 1 is a flowchart of an image processing method in Embodiment 1.

Exemplary embodiments of the present invention will be described below with reference to the accompanied drawings. In each of the drawings, the same elements will be denoted by the same reference numerals and the duplicate descriptions thereof will be omitted.

First of all, the definitions of terms and image restoration processing (image processing method) which are used in this embodiment will be described. The image processing method described in this embodiment is used as appropriate in each embodiment described later.

[Input Image]

An input image is a digital image (a shot image, or an original image) obtained by receiving light with an image pickup element via an image pickup optical system, and is deteriorated by an optical transfer function OTF depending on an aberration of the image pickup optical system including a lens and various optical filters. The image pickup optical system can be configured to use not only a lens, but also a mirror (a reflection surface) having a curvature.

An output image has, for example, information on an RGB color component. In addition to this color component, a color space, such as lightness, hue, and chroma which are expressed by LCH, lightness expressed by YCbCr, and color-difference signal, can be selected to use as color components. As alternative types of color spaces, XYZ, Lab, Yuv, and JCh can also be used. Furthermore, a color temperature may be used.

An input image or an output image can be accompanied by an image pickup condition, such as a focal length of a lens, an aperture value, and an object distance, and various correction information used to correct these images. When correction processing is performed for an original image which is transmitted from an image pickup apparatus to an image processing apparatus, it is preferable for the original image to be accompanied by an image pickup condition and information on correction, as mentioned above. As another method, the image pickup apparatus and the image processing apparatus may be directly or indirectly connected to each other to receive and transmit an image pickup condition and information on correction between them.

[Image Restoration Processing]

Subsequently, an outline of an image restoration processing will be described. The following Expression (1) is satisfied where g(x, y) is an original image (a deteriorated image), f(x, y) is an original image, and h(x, y) is a point spread function (PSF), which is a Fourier pair of an optical transfer function (OTF).

$$g(x,y)=h(x,y)*f(x,y) \quad (1)$$

In Expression (1), symbol * denotes a convolution (convolution integration, or convolution sum-product), and symbol (x, y) denotes coordinates on the original image.

G(u, v) represented by Expression (2) represented by the product of each frequency is obtained by the Fourier transform of g(x, y) represented by Expression (1) to convert to a display format on a frequency surface.

$$G(u,v)=H(u,v) \cdot F(u,v) \quad (2)$$

In Expression (2), H is an OTF obtained by the Fourier transform of the PSF (h), G and F are functions obtained by the Fourier transform of the deteriorated image g and the original image f, respectively, and (u, v) is coordinates on a two-dimensional frequency surface, that is, a frequency.

In order to obtain the original image f from the deteriorated shot image, both sides of Expression (2) only have to be divided by the optical transfer function H, as in the case of the following Expression (3).

$$G(u,v)/H(u,v)=F(u,v) \quad (3)$$

After that, when the reverse Fourier transform is performed for F(u, v), that is, G(u, v)/H(u, v) to reconvert the frequency surface to areal surface, the original image f (x, y) can be obtained as a restored image.

$$g(x,y)*R(x,y)=f(x,y) \quad (4)$$

In Expression (4), R(x, y) is called an "image restoration filter". If an image is a two-dimensional image, in general, an image restoration filter R also has a tap (cell) corresponding to each pixel of the image and thus has a distribution of two-dimensional filter values. Generally, the larger the tap number (the number of cells) of the image restoration filter R, the higher the restoration accuracy is. Therefore, a feasible tap number is set according to image quality, image processing capability, aberration characteristics and the like required. Since the image restoration filter R needs to reflect at least aberration and diffraction characteristics, it is different from a conventional edge-enhanced filter (a high-pass filter) with about three taps (horizontal, vertical, and orthogonal taps) or the like. Since the image restoration filter R is set based on an OTF, both of deteriorations of an amplitude component and a phase component can be highly accurately corrected.

Since an actual image contains a noise component, the use of the image restoration filter R created by a perfect inverse of the OTF results in a significant amplification of the noise component. The reason for this is that an MTF (an amplitude component) of the optical system is boosted such that its value returns to one over all frequencies from a state in which a noise amplitude is added to the amplitude of the image. The value of the MTF, which is an amplitude deterioration of the optical system, returns to one, but the power spectral of the noise is boosted at the same time. As a result, the noise is inevitably amplified depending on the degree of boosting of the MTF (restoration gain).

Thus, if an original image contains a noise, a satisfactory restored image as an image intended to be appreciated cannot be obtained. This is represented by the following Expressions (5-1) and (5-2).

$$G(u,v)=H(u,v)\cdot F(u,v)+N(u,v) \quad (5\text{-}1)$$

$$G(u,v)/H(u,v)=F(u,v)+N(u,v)/H(u,v) \quad (5\text{-}2)$$

In Expressions (5-1) and (5-2), N is a noise component.

With regard to an image containing a noise component, the method of controlling the degree of its restoration according to the strength ratio SNR of an image signal and a noise signal, as in the case of the Wiener filter represented by the following Expression (6), is known.

$$M(u,v) = \frac{1}{H(u,v)} \frac{|H(u,v)|^2}{|H(u,v)|^2 + SNR^2} \quad (6)$$

In Expression (6), M(u, v) is frequency characteristics of the Wiener filter, and |H(u, v)| is an absolute value (MTF) of an OTF. In this method, a restoration gain (the degree of restoration) is set, for each frequency, in proportion to a value of the MTF. Generally, an MTF of an image pickup optical system has higher values in low frequencies and lower values in high frequencies. In this method, substantially, the restoration gain in the high frequencies of an image is reduced.

Figure 2:
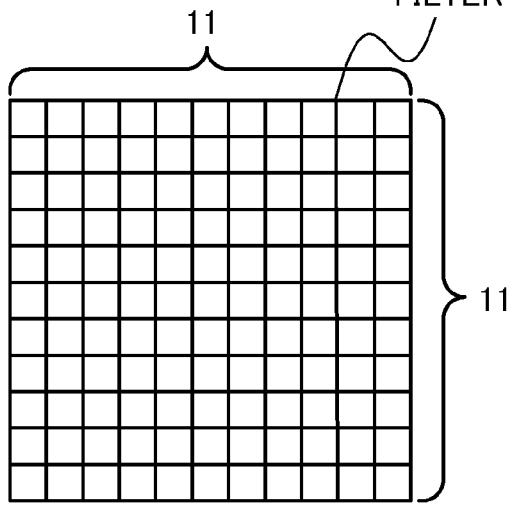
FIG. 2 is an explanatory diagram of an image restoration filter in each embodiment.
Figure 3:
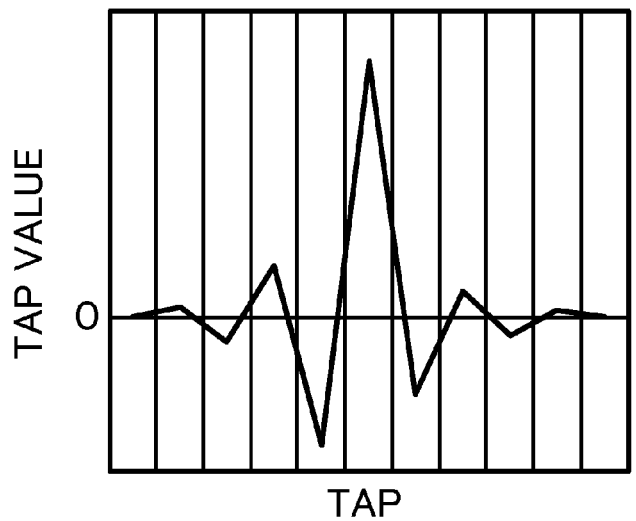
FIG. 3 is an explanatory diagram of an image restoration filter in each embodiment.

Subsequently, referring to FIGS. 2 and 3, an image restoration filter will be described. A tap number of an image restoration filter depends on aberration characteristics of an image pickup optical system and on a required restoration accuracy. The image restoration filter illustrated in FIG. 2 as an example is a two-dimensional filter having an 11×11 tap. In FIG. 2, while a value in each tap is omitted, one cross section of this image restoration filter is illustrated in FIG. 3. A distribution of values of each tap of the image restoration filter ideally has a function of reconstructing a signal or pixel value spatially spread due to the aberration as an original point.

Each tap of the image restoration filter is subjected to convolution processing (convolution integration/convolution sum-product) in an image restoration processing step depending on each pixel of an image. In the convolution processing, in order to improve the signal values of predetermined pixels, the predetermined pixels are arranged to coincide with the center of the image restoration filter. Then, for the image and its corresponding pixel values of the image restoration filter, each signal value of the image is multiplied by each tap value of the image restoration filter. Finally, the original signal values are replaced by the resulting total sum as the signal value of a center pixel.

Figure 4A:
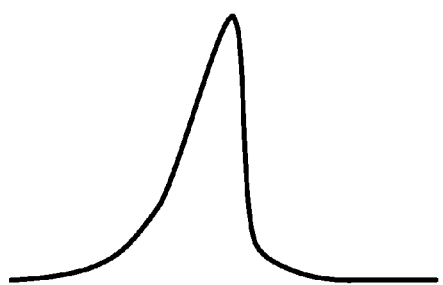
FIG. 4A is an explanatory diagram of a point spread function PSF in each embodiment.
Figure 4B:
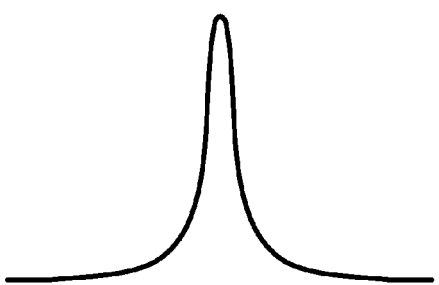
FIG. 4B is an explanatory diagram of a point spread function PSF in each embodiment.
Figure 5A:
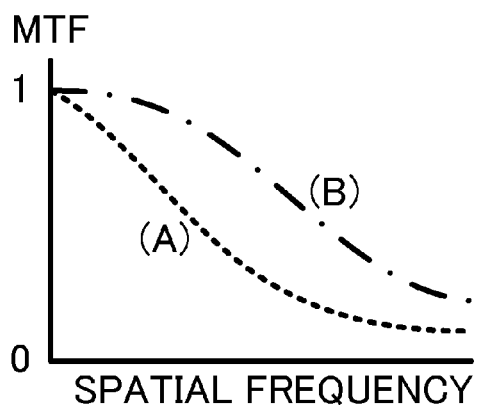
FIG. 5A is an explanatory diagram of an amplitude component MTF of an optical transfer function in each embodiment.
Figure 5B:
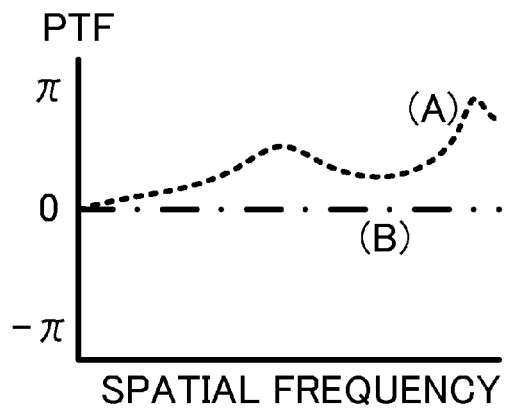
FIG. 5B is an explanatory diagram of a phase component PTF of an optical transfer function in each embodiment.

Subsequently, referring to FIGS. 4 and 5, image restoration characteristics observed in a real space and a frequency space will be described. FIGS. 4A and 4B are explanatory diagrams of a PSF. FIG. 4A illustrates a PSF observed when an image is not restored, and FIG. 4B illustrates a PSF observed when the image is restored. FIGS. 5A and 5B are an explanatory diagram of an amplitude component MTF of an OTF and an explanatory diagram of a phase component PTF of the OTF, respectively. In FIG. 5A, a dashed line (A) denotes an MTF observed when an image is not restored, and a dashed-dotted line (B) denotes an MTF observed when the image is restored. Similarly, in FIG. 5B, a dashed line (A) denotes a PTF observed when an image is not restored, and a dashed-dotted line (B) denotes a PTF observed when the image is restored. As illustrated in FIG. 4A, the PSF observed when the image is not restored is asymmetrically spread. Because of this asymmetry, the phase component PTF has a value nonlinear to the frequency. In the image restoration processing, an image is corrected such that an amplitude component MTF is amplified to cause a phase component to be zero, which makes a point spread function observed when the image is restored symmetrical and sharp-shaped.

As described above, an image restoration filter can be obtained by the reverse Fourier transform of a function designed based on an inverse function of an OTF of an image pickup optical system. The image restoration filter used in this embodiment can be changed as appropriate, and the Wiener filter described above, for example, can be used. When the Wiener filter is used, the reverse Fourier transform of M(u, v) represented by Expression (6) allows creation of an image restoration filter in a real space which is actually convoluted with an image.

An OTF varies depending on an image height of an image pickup optical system (a position in an image) even in one image pickup state. On the other hand, if an optical transfer function (an OTF) which is more predominantly affected by diffraction with an increase in an aperture value (an F value) suffers from a slight degree of effects due to vignetting by the optical system can be treated as an OTF which is invariant (constant) to an image height.

Embodiment 1

Next, referring to FIG. 1, an image processing method in Embodiment 1 of the present invention will be described. FIG. 1 is a flowchart illustrating the image processing method (image restoration processing) in Embodiment 1 of the present invention. The image restoration processing of this embodiment is performed by the image processing apparatus or by an image processor of the image pickup apparatus. Although the image processor will be mainly described below as a representative element which performs each step, the image processor can be replaced by the image processing apparatus.

First, at step S11, the image processor obtains an original image as an input image. When the image processing method is performed using the image processing apparatus, an original image can be obtained by connecting the image processing apparatus and the image pickup apparatus via wire or wirelessly. The image processing apparatus can obtain an original image also via a non-transitory computer-readable storage. On the other hand, when the image processing method is performed using the image pickup apparatus, the image pickup apparatus obtains an RAW image (an original image, or a shot image) as input data (an input image) of development processing. As described above, the image processing apparatus or an obtaining unit of the image pickup apparatus obtains the original image.

Subsequently, at step S12, the image processor obtains an image pickup condition. The image pickup condition includes an aperture value (an F number), a focal length, an object distance, and the like. When a lens unit (an interchangeable lens) removably mounted on the body (a camera body) of the image pickup apparatus is used, an image pickup condition further includes a lens ID and a camera ID as well. Information on an image pickup condition can be directly obtained from the image pickup apparatus, or can be obtained also from information attached to the original image.

Next, at step S13, the image processor determines, with respect to the input image (the original image), whether or not an aperture value is equal to or more than a predetermined value. When the aperture value is less than the predetermined value, the image processor determines that the input image is predominantly affected by an aberration and then proceeds to step S14. On the other hand, when the aperture value is equal to or more than the predetermined value, the image processor determines that the input image is predominantly affected by diffraction and then proceeds to step S18. As described above, in the image processing method of this embodiment, subsequent processing is switched according to an aperture value.

In this embodiment, a predetermined aperture value (a threshold value to switch subsequent processing) is set, for example, to F16. This embodiment, however, is not limited to this, and can be changed as appropriate according to an aberration amount of the image pickup optical system or a pixel pitch of the image pickup element. For instance, as represented by the following Conditional Expression (7), it is preferable to set, as a predetermined value, an aperture value for which a cutoff frequency due to diffraction that depends on the aperture value is smaller than a sampling frequency that depends on a pixel pitch of the image pickup element.

$$F \geq p/\lambda \quad (7)$$

In Conditional Expression (7), symbol F denotes an F number (an aperture value), symbol p denotes a pixel pitch, and symbol $\lambda$ denotes a predetermined wavelength chosen from a wavelength band of a visible light. Symbol $\lambda$ may also be the center wavelength of a wavelength band which can be received by the image pickup element. In other words, a predetermined aperture value only has to be set to a value which satisfies or approximately satisfies the relation of $F=p/\lambda$. For instance, where p=0.006 mm, the sampling frequency is 167 lines/mm. Accordingly, where $\lambda$=550 nm, the predetermined aperture value is F11.

If the image processor determines, at step S13, that an aperture value is less than a predetermined value, the image processor obtains, at step S14, an optical transfer function (a first optical transfer function) suitable for an image pickup condition. Such an optical transfer function can be selected from data previously stored in a storage unit. Alternatively, a function to generate an optical transfer function and its coefficient group may be previously stored as data to be used to newly generate the optical transfer function at step S14. In addition, performing an interpolation for an aperture value, an object distance, and a focal length of a zoom lens between image pickup conditions for which coefficient data are previously stored enables a reduction in the data volume of a previously stored optical transfer function. As the interpolation methods, the bilinear interpolation (linear interpolation) and the bicubic interpolation, for example, are known, but the interpolation method in this embodiment is not limited to these.

Next, at step S15, the image processor generates an image restoration filter by using the optical transfer function (the first optical transfer function). In this embodiment, an image restoration filter is generated depending on a position in the original image, that is, for each image height. Subsequently, at step S16, the image processor performs image restoration processing by convoluting the image restoration filter with the original image to generate a restored image. After that, at step S17, the image processor outputs the restored image as an output image.

On the other hand, if the image processor determines, at step S13, that an aperture value is equal to or more than the predetermined value, the image processor obtains, at step S18, an image restoration filter suitable for an image pickup condition. When an aperture value is equal to or more than a predetermined value, the predominant factor of an image deterioration is diffraction. Therefore, an image restoration filter does not depend on an image pickup condition such as an object distance and a focal length, and thus the image restoration filter may be selected depending only on an aperture value. That is, the image processor obtains an image restoration filter depending on an aperture value.

It is preferable that the tap number of the image restoration filter obtained at step S18 satisfies the following Conditional Expression (8).

$$1 < T \cdot p/(0.0016 \cdot F) < 6 \quad (8)$$

In Conditional Expression (8), symbol T denotes a tap number in horizontal and vertical directions, symbol p denotes a pixel pitch of the image pickup element, and symbol F denotes an F number (an aperture value). An excess of the lower limit of Expression (8) results in a shortage of a tap number for a spread of PSF due to an aberration or diffraction. This shortage makes it impossible to achieve a sufficient correction effect. On the other hand, an excess of the upper limit of Expression (8) results in an enlargement of the computation volume of convolution processing, leading to a decrease in processing speed. For instance, where p=0.006 mm, F=22, and the tap number T is an odd number, the relation of 7<T<35 is satisfied.

Alternatively, at step S16, the same tap number may be set for both of the image restoration filter generated at step S15 and the image restoration filter selected at step S18 to share the convolution processing performed at step S16. In this case, it is preferable to satisfy the following Conditional Expression (9).

$$1 < T \cdot p/(0.0016 \cdot F) < 12 \quad (9)$$

As represented by the Conditional Expression (9), raising the upper limit of Conditional Expression (8) makes it possible to avoid a shortage of a tap number for a spread of PSF even in an image pickup condition predominantly affected by an aberration.

Subsequently, at step S16, in the same manner as that described above, the image processor performs image restoration processing by convoluting the image restoration filter with the original image to generate a restored image. After that, at step S17, the image processor outputs the restored image as an output image.

As described above, in this embodiment, data to be previously stored in the image processing apparatus or the image pickup apparatus (the image processor) are an optical transfer function or coefficient data to generate an optical transfer function which is obtained in the case where an aperture value is less than a predetermined value, and an image restoration filter selected in the case where an aperture value is equal to or more than a predetermined value. This leads to a reduction of the volume of data on an optical transfer function obtained in the case where an aperture value is equal to or more than a predetermined value. Furthermore, in the case where an aperture value is equal to or more than a predetermined value, an image restoration filter does not need to be generated for each image height at step S15, and the same image restoration filter can be used for the entire region of the image without switching an image restoration filter depending on each image height at step S16.

Figure 6:
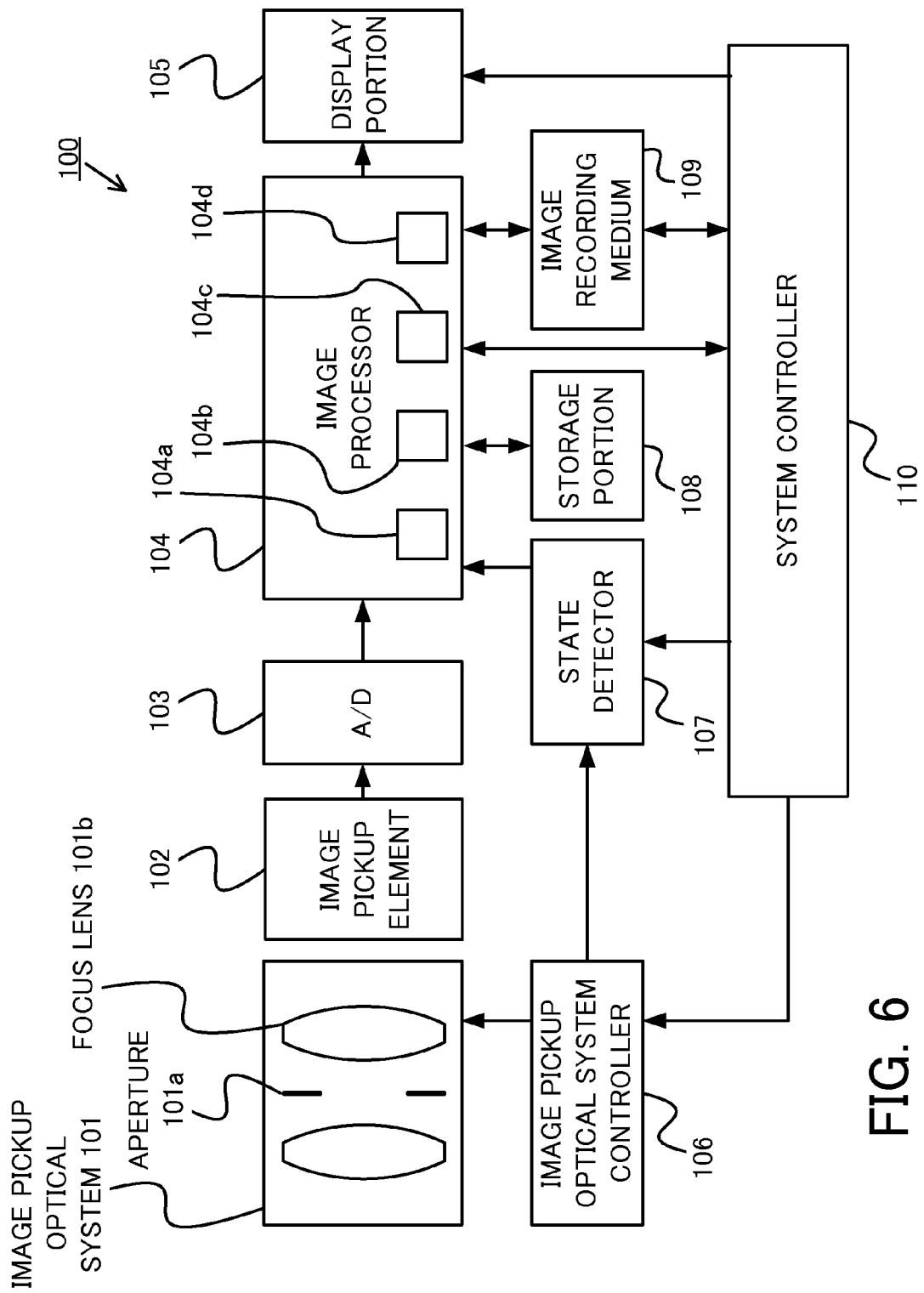
FIG. 6 is a configuration diagram of an image pickup apparatus in Embodiment 1.

Next, referring to FIG. 6, the image pickup apparatus in this embodiment will be described. FIG. 6 is a configuration diagram of an image pickup apparatus 100 in this embodiment. The image pickup apparatus 100 is capable of generating a restored image from an original image by performing the image processing method (image restoration processing) of this embodiment described with reference to FIG. 1.

In the image pickup apparatus 100, an object (not illustrated in the drawing) is formed on an image pickup element 102 via an image pickup optical element which includes an aperture stop 101a and a focus lens 101b. The image pickup element 102 then photoelectrically converts the object image formed via the image pickup optical system 101 to obtain an original image. The object image formed on the image pickup element 102 is converted to an electrical signal and then output to an A/D convertor 103. The A/D convertor 103 converts the input electrical signal (the analog signal) to a digital signal and then outputs the digital signal to an image processor 104. An original image is obtained by this series of processing.

The image processor 104 (an image processing unit) performs image restoration processing in addition to predetermined processing. First, the image processor 104 obtains an image pickup condition (image pickup condition information) of the image pickup apparatus 100 from a state detector 107. The image pickup condition information includes an aperture value, an object distance, a focal length of a zoom lens, and the like. The state detector 107 is capable of not only obtaining image pickup condition information directly from a system controller 110, but also obtaining, for example, image pickup condition information on the image pickup optical system 101 from an image pickup optical system controller 106. A storage portion 108 (a storage unit) stores a first optical transfer function which is different depending on an image pickup condition and a position in an original image. The storage portion 108 further stores an image restoration filter whose distribution of two-dimensional filter values is constant with respect to a position in the original image and different depending on the aperture value, or a function (coefficient data) to generate a second optical transfer function. The expression "store an 'image restoration filter' whose distribution of two-dimensional filter values is 'constant with respect to a position in an original image'" can be rephrased as follows. That is, the storage portion 108 stores a common restoration filter serving as an image restoration filter to be calculated with respect to a first pixel value and as an image restoration filter to be calculated with respect to a second pixel vale. In this embodiment, a "first pixel value" means a pixel value corresponding to a first image height in the object image and a "second pixel value" means a pixel value corresponding to a second image height in the object image. The first image height and the second image height are different one from each other.

The image processor 104 includes an image obtaining unit 104a, a data obtaining unit 104b, a filter generating unit 104c, and an image processing unit 104d. The image obtaining unit 104a (an obtaining unit) obtains an original image and its image pickup condition. The data obtaining unit 104b obtains a first optical transfer function when an aperture value is less than a predetermined value. On the other hand, the data obtaining unit 104b obtains an image restoration filter or a second optical transfer function generated based on a function to generate the second optical transfer function when the aperture value is equal to or more than the predetermined value. When the data obtaining unit 104b obtains a first or second optical transfer function, the filter generating unit 104c generates an image restoration filter based on the first or second optical transfer function obtained. The image processing unit 104d generates a restored image from the original image by using the image restoration filter stored in the storage portion 108 or the image restoration filter generated by the filter generating unit 104c. In this embodiment, when the aperture value is equal to or more than the predetermined value, an image restoration filter depending on the aperture value is selected. In this case, a second optical transfer function does not need to be generated.

The output image (the restored image) processed by the image processor 104 is recorded in an image recording medium 109 in a predetermined format. On a display portion 105, an image for which the image processing in this embodiment and predetermined processing that enables display of the image are performed is displayed. Alternatively, an image for which simplified processing that permits high-speed display is performed may be displayed.

This series of control operations in the image pickup apparatus 100 is performed by the system controller 110. The mechanical driving of the image pickup optical system 101 is performed by the image pickup optical system controller 106 based on an instruction of the system controller 110. The aperture diameter of the aperture stop 101a is controlled as a shooting status setting of the aperture value (the F number). The position of the focus lens 101b is controlled by an auto focus (AF) mechanism or a manual focus mechanism (both of which are not illustrated in the drawings) to perform focusing according to an object distance.

The image pickup optical system 101 may include an optical element such as an optical low-pass filter or an infrared radiation cut filter. In the case where an element, such as an optical low-pass filter, which affects characteristics of an optical transfer function (an OTF), is used, it is preferable to take an effect into consideration when generating the image restoration filter. Also in the case where the infrared radiation cut filter is used, it is preferable to take an effect into consideration when generating the image restoration filter. This is because the infrared radiation cut filter affects each PSF of an RGB channel, which is an integral value of a point spread function (a PSF) of a spectral wavelength, especially a PSF of an R channel. In this case, an image restoration filter is generated based further on a third optical transfer function caused by, i.e. depending on, an optical low-pass filter.

In addition, since the shape of a pixel aperture also affects an optical transfer function, it is preferable to take its effect into consideration. In this case, an image restoration filter is generated based further on a fourth optical transfer function caused by, i.e. depending on, the pixel aperture. It is also preferable to prepare the image restoration filter used in the case where aperture value is equal to or more than the predetermined value, taking into consideration various factors such as the optical low-pass filter, the infrared radiation cut filter, and the pixel aperture.

In this embodiment, while the image pickup optical system 101 is configured to be integrated with the image pickup apparatus (an image pickup apparatus body), the configuration is not limited to this. The image pickup optical system 101 may be an interchangeable lens removably mounted on the image pickup apparatus body such as a single lens reflex camera.

Embodiment 2

Figure 7:
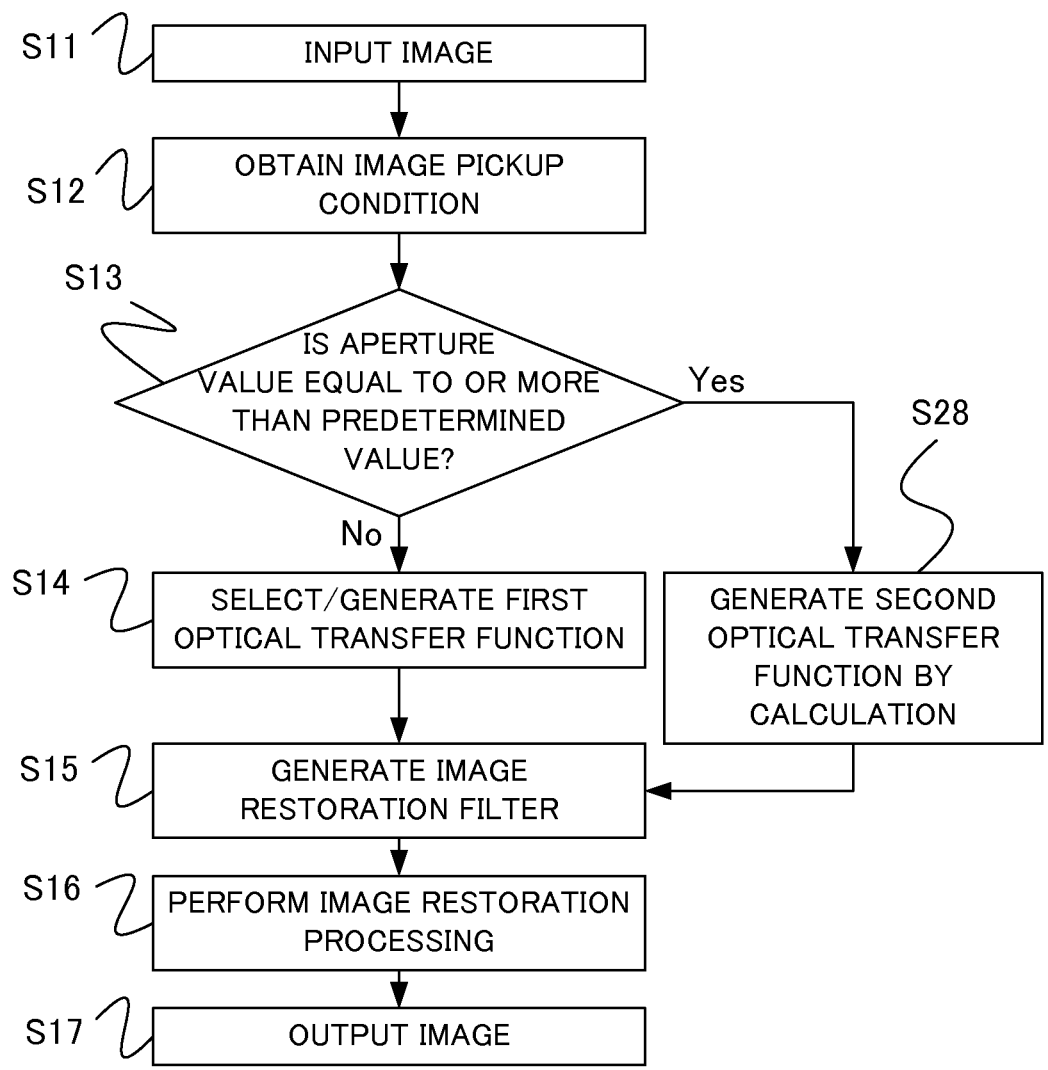
FIG. 7 is a flowchart of an image processing method in Embodiment 2.

Next, referring to FIG. 7, an image processing method in Embodiment 2 of the present invention will be described. FIG. 7 is a flowchart illustrating the image processing method (image restoration processing) in this embodiment. The image processing method in this embodiment is performed by the image processing apparatus or by the image processor of the image pickup apparatus. Although the image processor will be mainly described below as a representative element which performs each step, the image processor can be replaced by the image processing apparatus. In this embodiment, since steps S11 to S17 of FIG. 7 are the same as those of Embodiment 1, a description thereof will be omitted.

When the image processor determines, at step S13, that the aperture value is equal to or more than the predetermined value, the image processor calculates and generates, at step S28, an optical transfer function (a second optical transfer function) suitable for an image pickup condition. In this embodiment, a function to generate a second optical transfer function stored in the storage portion 108 is a calculation expression of an optical transfer function which depends on an aperture value.

When the aperture value is equal to or more than the predetermined value, the predominant factor of an image deterioration is diffraction. Therefore, an optical transfer function (the second optical transfer function) does not depend on an image pickup condition such as an object distance and a focal length, but only depends on an aperture value. In this situation, an optical transfer function caused by diffraction depends not only on an aperture value, but also on a wavelength of light. An optical transfer function for each color component can be generated by weighing for each wavelength based on the spectral information of an assumed light source and the receiving sensitivity information of the image pickup element. Alternatively, the calculation may be performed using a representative wavelength for each of predetermined color components.

Next, at step S15, the image processor generates an image restoration filer by using the optical transfer function (the second optical transfer function). In this embodiment, the image restoration filter has a distribution of two-dimensional filter values which is constant with respect to a position in an original image and different depending on an aperture value. Subsequently, at step S16, the image processor performs image restoration processing by convoluting the image restoration filter with the original image to generate a restored image. After that, at step S17, the image processor outputs the restored image as an output image.

Therefore, data to be previously stored in the image processing apparatus or the image pickup apparatus are an optical transfer function or coefficient data to generate an optical transfer function which is obtained in the case where the aperture value is less than the predetermined value. This leads to a reduction of the volume of data on an optical transfer function obtained in the case where the aperture value is equal to or more than the predetermined value. Furthermore, at step S16, in the case where the aperture value is equal to or more than the predetermined value, the same image restoration filter can be used for the entire region of the image without switching an image restoration filter depending on each image height.

Since the configuration of the image pickup apparatus of this embodiment is the same as that of the image pickup apparatus 100 of Embodiment 1 described with reference to FIG. 6, a description thereof will be omitted. This embodiment can achieve a reduction of the volume of data retained in the storage portion of the image pickup apparatus and a reduction of the volume of computation required in the case where an aperture value is equal to or more than a predetermined value as well.

Embodiment 3

Figure 10:
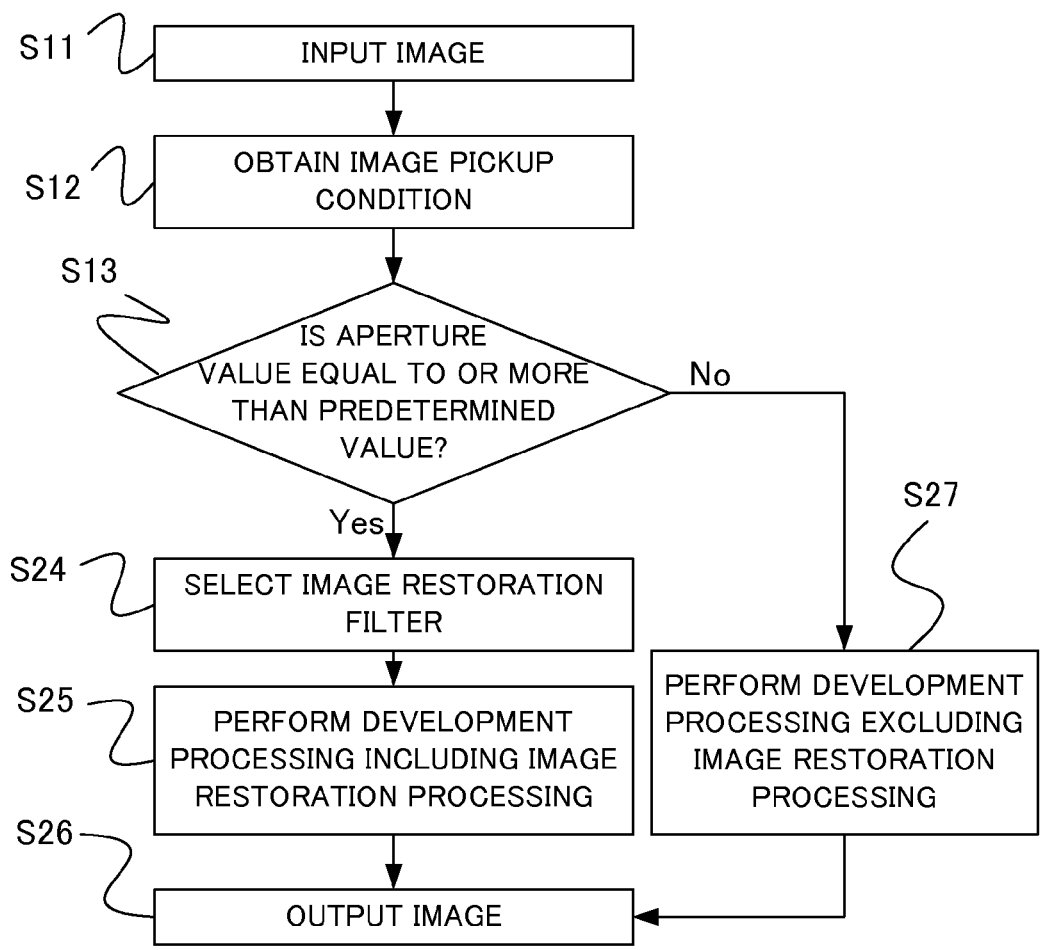
FIG. 10 is a flowchart of an image processing method in Embodiment 3.

Next, referring to FIG. 10, an image processing method in Embodiment 3 of the present invention will be described. FIG. 10 is a flowchart illustrating the image processing method (image restoration processing) in this embodiment. The image processing method in this embodiment is performed by the image processing apparatus or by the image processor of the image pickup apparatus. Although the image processor will be mainly described below as a representative element which performs each step, the image processor can be replaced by the image processing apparatus.

First, at step S11, the image processor obtains an original image as an input image. When the image processing method is performed using the image processing apparatus, the original image can be obtained by connecting the image processing apparatus and the image pickup apparatus via wire or wirelessly. The image processing apparatus can obtain the original image also via a non-transitory computer-readable storage medium. On the other hand, when the image processing method is performed using the image pickup apparatus, the image pickup apparatus obtains a RAW image (an original image) as input data (an input image) of development processing. As described above, the image processing apparatus or an obtaining unit of the image pickup apparatus obtains the original image.

Subsequently, at step S12, the image processor obtains an image pickup condition. The image pickup condition includes an aperture value (an F number), a focal length, an object distance, and the like. When a lens unit (an interchangeable lens) removably mounted on the body (a camera body) of the image pickup apparatus is used, an image pickup condition further includes a lens ID and a camera ID. Information on an image pickup condition can be directly obtained from the image pickup apparatus, or can be obtained also from information attached to the original image.

Next, at step S13, the image processor determines, with respect to the input image (the original image), whether or not an aperture value is equal to or more than a predetermined value. If the aperture value is equal to or more than the predetermined value, the image processor determines that the input image is predominantly affected by diffraction and then proceeds to step S24. As described above, in the image processing method of this embodiment, subsequent processing is switched according to an aperture value.

In this embodiment, a predetermined aperture value (a threshold value to switch subsequent processing) is set, for example, to F16. This embodiment, however, is not limited to this, and can be changed as appropriate according to an aberration amount of the image pickup optical system or a pixel pitch of the image pickup element. For instance, as represented by the following Conditional Expression (10), it is preferable to set, as a predetermined value, an aperture value for which a cutoff frequency due to diffraction that depends on the aperture value is smaller than a sampling frequency that depends on a pixel pitch of the image pickup element.

$$F \geq p/\lambda \qquad (10)$$

In Conditional Expression (10), symbol F denotes an F number (an aperture value), symbol p denotes a pixel pitch, and symbol λ denotes a predetermined wavelength chosen from a wavelength band of a visible light. Symbol λ may also be the center wavelength of a wavelength band which can be received by the image pickup element. In other words, a predetermined aperture value only has to be set to a value which satisfies or approximately satisfies the relation of $F=p/\lambda$. For instance, where p=0.006 mm, the sampling frequency is 167 lines/mm. Accordingly, where λ=550 nm, the predetermined aperture value is F11.

When the image processor determines, at step S13, that an aperture value is equal to or more than the predetermined value, the image processor obtains, at step S24, an image restoration filter suitable for an image pickup condition. When the aperture value is equal to or more than the predetermined value, the predominant factor of an image deterioration is diffraction. Therefore, an image restoration filter does not depend on an image pickup condition such as an object distance and a focal length, and thus the image restoration filter may be selected depending only on an aperture value. That is, the image processor obtains an image restoration filter depending on an aperture value. However, an image restoration filter may be selected taking into consideration other image pickup conditions in addition to the aperture value because an effective F number varies depending on an object distance.

It is preferable that the tap number of the image restoration filter obtained at step S24 satisfies the following Conditional Expression (11).

$$1 < T \cdot p/(0.0016 \cdot F) < 6 \quad (11)$$

In Conditional Expression (11), symbol T denotes a tap number in horizontal and vertical directions, symbol p denotes a pixel pitch of the image pickup element, and symbol F denotes an F number (an aperture value). An excess of the lower limit of Expression (8) results in a shortage of a tap number for a PSF spread due to an aberration or diffraction. This shortage makes it impossible to achieve a sufficient correction effect. On the other hand, an excess of the upper limit of Expression (8) results in an enlargement of the computation volume of convolution processing, leading to a decrease in processing speed. For instance, where p=0.006 mm, F=22, and T is an odd number, the relation of 7<T<35 is satisfied.

As represented by the following Conditional Expression (12), raising the upper limit of Conditional Expression (11) makes it possible to avoid a shortage of a tap number for a spread of PSF even in an image pickup condition predominantly affected by an aberration.

$$1 < T \cdot p/(0.0016 \cdot F) < 12 \quad (12)$$

Subsequently, at step S25, the image processor performs image restoration processing by convoluting the image restoration filter with the original image to generate a restored image. In this situation, the image processor performs various processing related to development processing in addition to the image restoration processing. In this convolution processing, the same image restoration filter can be used for the entire region of the image without switching an image restoration filter depending on each image height. After that, at step S26, the image processor outputs the restored image as an output image.

As described above, in this embodiment, the image restoration filter obtained in the case where an aperture value is equal to or more than a predetermined value is sufficient as data to be previously stored in the image processing apparatus or the image pickup apparatus (the image processor). An image restoration filter for each aperture value may further have a plurality of restoration gains (restoration strengths).

On the other hand, when the image processing unit determines, at step S13, that the aperture value is less than the predetermined value, the image processing unit performs, at step S27, various processing related to development processing excluding the image restoration processing. After that, at step S26, the image processing unit outputs the image for which such various processing is performed as an output image. In other words, when the image processing unit determines, at step S13, that the aperture value is less than a predetermined value, the image processing unit does not perform the restoration processing.

While the case in which the image processing unit does not perform the restoration processing when the image restoration unit determines, at step S13, that the aperture value is less than the predetermined value is described, this embodiment is not limited to this.

Figure 11:
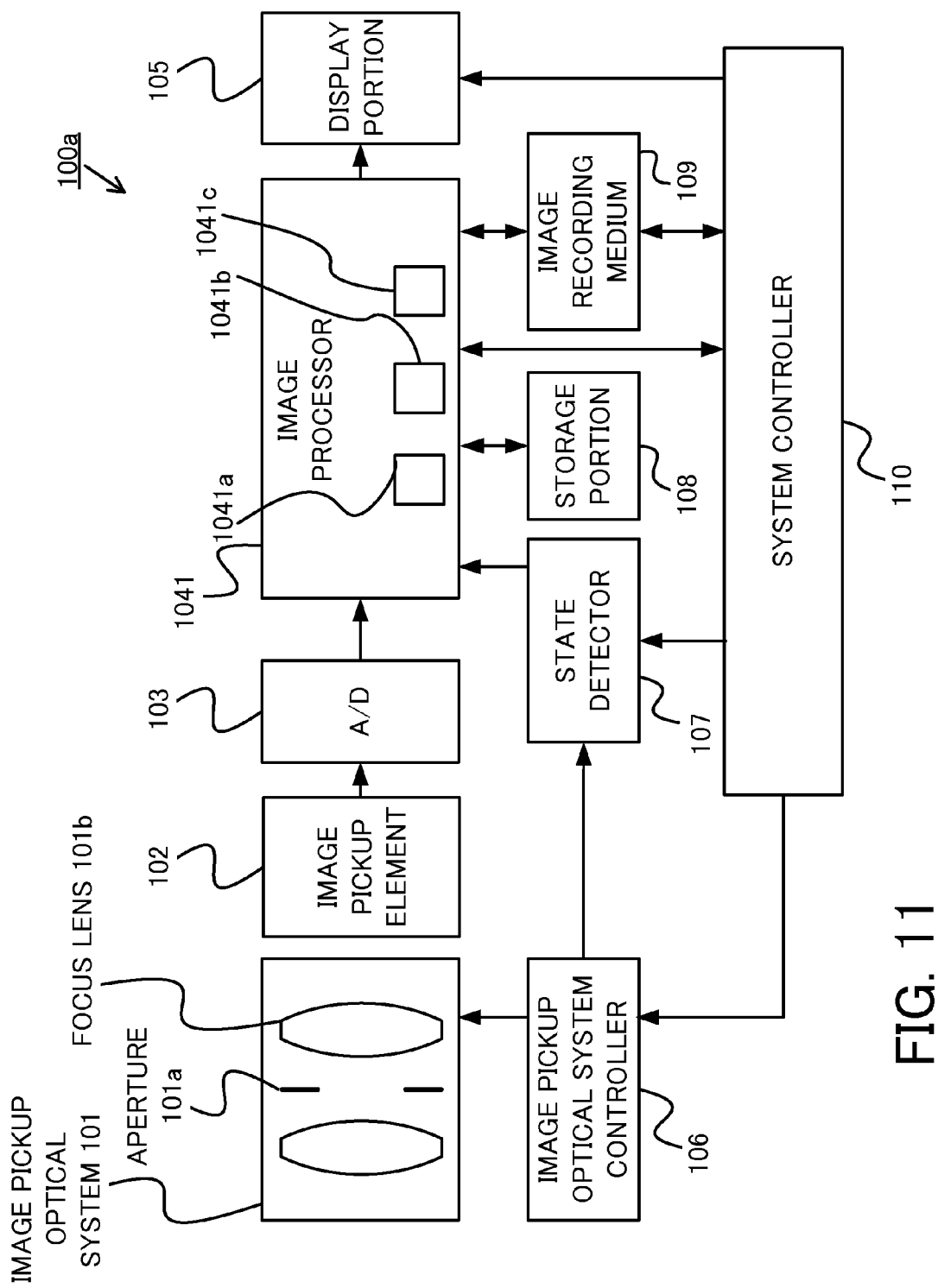
FIG. 11 is a configuration diagram of an image pickup apparatus in Embodiment 3.

Next, referring to FIG. 11, an image pickup apparatus in this embodiment will be described. FIG. 11 is a configuration diagram of an image pickup apparatus 100a in this embodiment. The image pickup apparatus 100a is capable of generating a restored image from an original image by performing the image processing method (image restoration processing) of this embodiment described with reference to FIG. 10.

In the image pickup apparatus 100a, an object (not illustrated in the drawing) is formed on an image pickup element 102 via an image pickup optical system 101 which includes an aperture stop 101a (or a light shielding member) and a focus lens 101b. The image pickup element 102 then photoelectrically converts the object image formed via the image pickup optical system 101 to obtain an original image. The object image formed on the image pickup element 102 is converted to an electrical signal and then output to an A/D convertor 103. The A/D convertor 103 converts the input electrical signal (the analog signal) to a digital signal and then outputs the digital signal to an image processor 104. An original image is obtained by this series of processing.

The image processor 1041 (an image processing unit) performs image restoration processing in addition to predetermined processing. First, the image processor 1041 obtains an image pickup condition (image pickup condition information) of the image pickup apparatus 100a from a state detector 107. The image pickup condition information includes an aperture value, an object distance, a focal length of a zoom lens, and the like. The state detector 107 is capable of not only obtaining image pickup condition information directly from a system controller 110, but also obtaining, for example, image pickup condition information on the image pickup optical system 101 from an image pickup optical system controller 106. A storage portion 108 stores a plurality of image restoration filters which are constant with respect to a position in an original image and different depending on an aperture value. The expression "store an image restoration filter which is constant with respect to a position in an original image" can be rephrased as follows. That is, the storage potion 108 stores a common third image restoration filter serving as an image restoration filter to be calculated with respect to a first pixel value and as an image restoration filter to be calculated with respect to a second pixel value. In this embodiment, the "first pixel value" means a pixel value corresponding to a first image height of the object image and the "second pixel value" means a pixel value corresponding to a second image height in the object image. The first image height and the second image height are different one from each other. An optical transfer function or coefficient data to generate an optical transfer function may be stored as needed.

An image processor 1041 includes a data selecting unit 1041a, an image processing unit 1041b, and a determining unit 1041c. The data selecting unit 1041a selects an image restoration filter from a plurality of image restoration filters depending on an aperture value when the aperture value is equal to or more than a predetermined value. The image processing unit 1041b generates a stored image from the original image by using the image restoration filter selected by the data selecting unit 1041a when the aperture value is equal to or more than the predetermined value. The determining unit 1041c determines with respect to the original image obtained by the image pickup element 102 whether or not the aperture value is equal to or more than the predetermined value.

The output image (the restored image) processed by the image processor 1041 is recorded in an image recording medium 109 in a predetermined format. A display portion 105 displays an image for which the image processing in this embodiment and predetermined processing that enables display of the image are performed. Alternatively, the display portion 105 may display an image for which simplified processing that permits high-speed display is performed. This series of control operations in the image pickup apparatus 100a is performed by the system controller 110. The mechanical driving of the image pickup optical system 101 is performed by the image pickup optical system controller 106 based on an instruction of the system controller 110. The aperture diameter of the aperture stop 101a is controlled as a shooting status setting of an aperture value (an F number). The position of the focus lens 101b is controlled by an auto focus (AF) mechanism or a manual focus mechanism (both of which are not illustrated in the drawings) to perform focusing according to an object distance.

The image pickup optical system 101 may include an optical element such as an optical low-pass filter or an infrared radiation cut filter. In the case where an element, such as an optical low-pass filter, which affects characteristics of an optical transfer function (an OTF), is used, it is preferable to take an effect into consideration when generating an image restoration filter. In this case, the image restoration filter is generated based further on an optical transfer function (a second optical transfer function) caused by, i.e. depending on, the optical low-pass filter. Also in the case where an infrared radiation cut filter is used, it is preferable to take its effect into consideration when generating an image restoration filter. This is because the infrared radiation cut filter affects each PSF of an RGB channel, which is an integral value of a point spread function (a PSF) of a spectral wavelength, especially a PSF of an R channel. In this case, the image restoration filter is generated based further on an optical transfer function caused by, i.e. depending on, an optical low-pass filter. In addition, since the shape of a pixel aperture also affects an optical transfer function, it is preferable to take the effect into consideration. In this case, an image restoration filter is generated based further on an optical transfer function caused by the pixel aperture. In this embodiment, it is preferable to prepare an image restoration filter used in the case where an aperture value is equal to or more than a predetermined value, taking into consideration various factors such as an optical low-pass filter, an infrared radiation cut filter, and a pixel aperture which are characteristics that do not depend on an image height.

In this embodiment, while the image pickup optical system 101 is configured to be integrated with the image pickup apparatus (an image pickup apparatus body), the configuration is not limited to this. The image pickup optical system 101 may be an interchangeable lens removably mounted on the image pickup apparatus body such as a single lens reflex camera.

Embodiment 4

Figure 8:
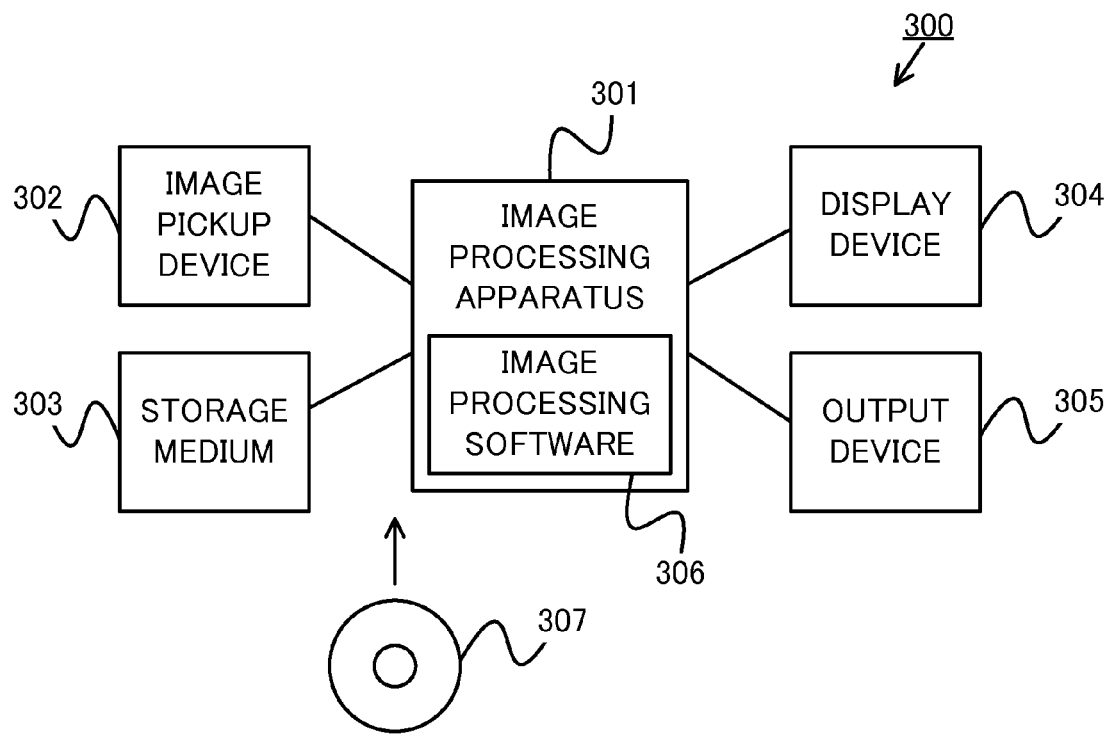
FIG. 8 is a configuration diagram of an image processing system in Embodiment 4.
Figure 9:
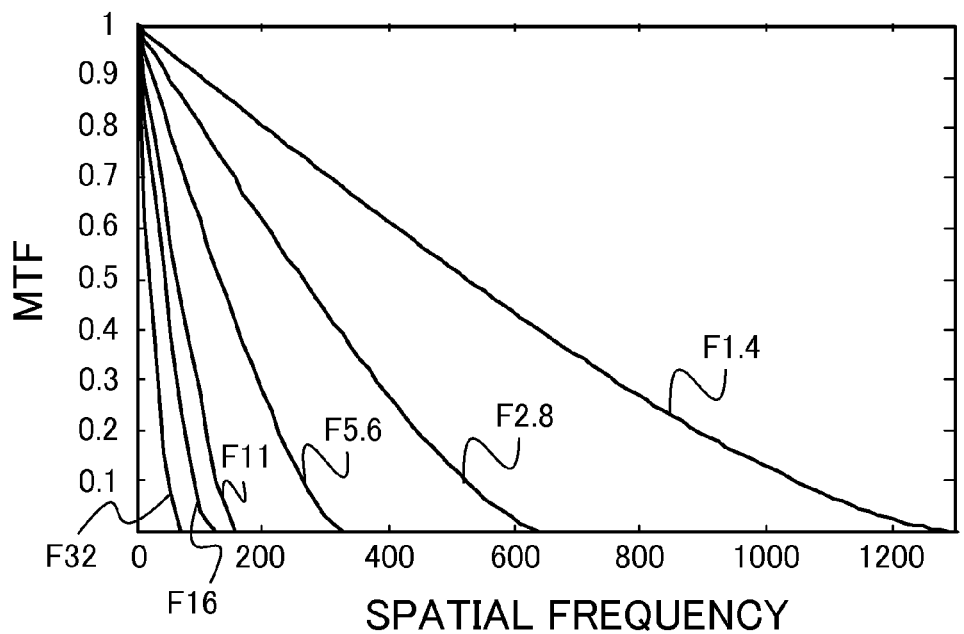
FIG. 9 is an explanatory diagram of a diffraction limit curve.

Next, referring to FIG. 8, an image processing system in Embodiment 4 of the present invention will be described. FIG. 8 is a configuration diagram of an image processing system 300 in this embodiment. Since a processing flow (an image processing method) of this embodiment is the same as that of Embodiment 1 described with reference to FIG. 1, that of Embodiment 2 described with reference to FIG. 7, or that of Embodiment 3 described with reference to FIG. 10, a description thereof will be omitted.

In FIG. 8, an image processing apparatus 301 is a computer device including image processing software 306 which causes a computer (an information processing apparatus) to execute the image processing method of this embodiment. The image processing apparatus 301 includes an image obtaining unit (an obtaining unit), a data obtaining unit, a filter generating unit, and image processing unit, as in the case of the image processor 104 of the image pickup apparatus 100 in each of Embodiments 1 and 2. The image processing apparatus 301 may includes a data selecting unit, an image processing unit, and a determining unit, as in the case of the image processor 1041 of the image pickup apparatus 100a in Embodiment 3. The image processing apparatus 301 may also have both of the configurations of the image processor 104 and the image processor 1041. An image pickup device 302 is an image pickup apparatus such as a camera, a microscope, an endoscope, or a scanner. A non-transitory computer-readable storage medium 303 is a storage unit which stores an original image such as a semiconductor memory, a hard disk, or a server on a network.

This embodiment can be implemented also by performing the following processing. That is, software (a program) which implements functions of the embodiments described above is supplied to and stored in a system or a computer of an apparatus (or a CPU or an MPU) via a non-transitory computer-readable storage medium 307 such as a network or a CD-ROM. Then, the system or the computer of the apparatus (or the CPU or the MPU) reads and executes the program.

The image processing apparatus 301 obtains shot image data from the image pickup device 302 or the non-transitory computer-readable storage medium 303, and then outputs the image data for which predetermined processing is performed to one or more of an output device 305, e.g., a printer, the image pickup device 302, and the non-transitory computer-readable storage medium 303. The component to which the original image data is output can also be stored in a storage portion included in the image processing apparatus 301. The output device 305 is, for example, a printer.

A display device 304, which is a monitor, is connected to the image processing apparatus 301. This connection allows a user to perform image processing operations through the display device 304 and to evaluate a corrected image. Image processing software 306 performs the image restoration processing (the image restoration method) of Embodiment 1 or 2 and performs development or other image processing as needed.

In this embodiment, it is preferable that information on the details of and how to receive and transmit between the devices data to be used to perform image processing (hereinafter, collectively referred to as "corrected information") is attached to individual image data. The attachment of necessary corrected information to individual image data enables a device including the image processing apparatus of this embodiment to appropriately perform correction processing (image restoration processing).

According to each of Embodiments 1, 2, and 4, it is possible to determine that an image pickup condition which is predominantly affected by an aberration or an image pickup condition which is predominantly affected by diffraction, and thus to switch and perform image restoration processing based on the determination. According to each of Embodiments 3 and 4, it is possible to efficiently reduce the deterioration of an image sharpness caused by a diffraction phenomenon by performing image restoration processing with an appropriate image restoration filter selected depending on an aperture value (an F number) in the case where the aperture value is large. Therefore, according to each embodiment, it is possible to provide an image pickup apparatus, an image processing apparatus, an image processing method, and a non-transitory computer-readable storage medium which are capable of performing highly-accurate image restoration processing while reducing amounts of data and calculation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SINGS LIST

101 IMAGE PICKUP OPTICAL SYSTEM
102 IMAGE PICKUP ELEMENT
104 IMAGE PROCESSOR
107 STATE DETECTOR
108 STORAGE PORTION

The invention claimed is:

1. An image pickup apparatus capable of generating a restored image from an original image, the image pickup apparatus comprising:
   an image pickup element configured to photoelectrically convert an object image formed via an image pickup optical system to obtain the original image;
   a storage unit configured to store a first optical transfer function which is different depending on an image pickup condition and on a position in the original image, and an image restoration filter whose distribution of two-dimensional filter values is constant with respect to a position in the original image and different depending on an aperture value or a function designed to generate a second optical transfer function;
   a data obtaining unit configured to obtain the first optical transfer function when the aperture value is less than a predetermined value, and obtain the image restoration filter or the second optical transfer function generated based on the function designed to generate the second optical transfer function when the aperture value is not less than the predetermined value;
   a filter generating unit configured to generate an image restoration filter based on the first optical transfer function or the second optical transfer function when the data obtaining unit obtains the first optical transfer function or the second optical transfer function; and
   an image processing unit configured to generate the restored image from the original image by using the image restoration filter stored in the storage unit or the image restoration filter generated by the filter generating unit.

2. The image pickup apparatus according to claim 1, wherein the function designed to generate the second optical transfer function stored in the storage unit is a calculation expression of an optical transfer function which depends on the aperture value.

3. The image pickup apparatus according to claim 1, wherein the image restoration filter is generated based further on a third optical transfer function depending on an optical low-pass filter.

4. The image pickup apparatus according to claim 3, wherein the image restoration filter is generated based further on a fourth optical transfer function depending on a pixel aperture.

5. The image pickup apparatus according to claim 1, wherein the image restoration filter satisfies $1 < T \cdot p/(0.0016 \cdot F) < 6$ where T is a tap number of the image restoration filter, p is a pixel pitch of the image pickup element, and F is the aperture value.

6. The image pickup apparatus according to claim 1, wherein the predetermined value of the aperture value satisfies $F = p/\lambda$ where F is the aperture value, p is a pixel pitch of the image pickup element, and $\lambda$ is a predetermined wavelength of a wavelength band of a visible light.

7. The image pickup apparatus according to claim 1, wherein the image pickup condition includes an object distance and a focal length.

8. An image processing apparatus capable of generating a restored image from an original image, the image processing apparatus comprising:
   an obtaining unit configured to obtain the original image and an image pickup condition of the original image;
   a storage unit configured to store a first optical transfer function which is different depending on the image pickup condition and on a position in the original image, and an image restoration filter whose distribution of two-dimensional filter values is constant with respect to a position in the original image and different depending on an aperture value or a function designed to generate a second optical transfer function;
   a data obtaining unit configured to obtain the first optical transfer function when the aperture value is less than a predetermined value, and obtain the image restoration filter or the second optical transfer function generated based on the function designed to generate the second optical transfer function when the aperture value is not less than the predetermined value;
   a filter generating unit configured to generate an image restoration filter based on the first optical transfer function or the second optical transfer function when the data obtaining unit obtains the first optical transfer function or the second optical transfer function; and
   an image processing unit configured to generate the restored image from the original image by using the image restoration filter stored in the storage unit or the image restoration filter generated by the filter generating unit.

9. An image processing method of generating a restored image from an original image, the method comprising the steps of:
   obtaining the original image and an image pickup condition of the original image;
   obtaining a first optical transfer function from a storage unit, the storage unit storing the first optical transfer function which is different depending on the image pickup condition and on a position in the original image to be used when an aperture value of the image pickup condition is less than a predetermined value, and the storage unit storing an image restoration filter whose distribution of two-dimensional filter values is constant with respect to a position in the original image and different depending on the aperture value or a function designed to generate a second optical transfer function to be used when the aperture value is not less than the predetermined value;
   obtaining, from the storage unit, the image restoration filter or the second optical transfer function generated based on the function designed to generate the second optical transfer function when the aperture value is not less than the predetermined value;

generating an image restoration filter based on the first optical transfer function or the second optical transfer function when a data obtaining unit obtains the first optical transfer function or the second optical transfer function; and generating the restored image from the original image by using the image restoration filter stored in the storage unit or the image restoration filter generated by a filter generating unit.

10. A non-transitory computer-readable storage medium storing an image processing program to generate a restored image from an original image, the image processing program being configured to cause an information processing apparatus to execute the steps of:

obtaining the original image and an image pickup condition of the original image;

obtaining a first optical transfer function from a storage unit, the storage unit storing the first optical transfer function which is different depending on the image pickup condition and on a position in the original image to be used when an aperture value of the image pickup condition is less than a predetermined value, and the storage unit storing an image restoration filter whose distribution of two-dimensional filter values is constant with respect to a position in the original image and different depending on the aperture value or a function designed to generate a second optical transfer function to be used when the aperture value is not less than the predetermined value;

obtaining, from the storage unit, the image restoration filter or the second optical transfer function generated based on the function designed to generate the second optical transfer function if the aperture value is equal to or more than a predetermined value;

generating an image restoration filter based on the first optical transfer function or the second optical transfer function when a data obtaining unit obtains the first optical transfer function or the second optical transfer function; and generating the restored image from the original image by using the image restoration filter stored in the storage unit or the image restoration filter generated by a filter generating unit.

11. An image pickup apparatus capable of generating a restored image from an original image, the image pickup apparatus comprising:

an image pickup element configured to photoelectrically convert an object image formed via an image pickup optical system to obtain the original image;

a determining unit configured to determine whether an aperture value which is set when the original image is shot is not less than a predetermined value; and an image processing unit configured to generate the restored image from the original image by using an image restoration filter which is different depending on an image pickup condition and on a position in the original image when the aperture value is less than the predetermined value, and by using an image restoration filter whose distribution of two-dimensional filter values is constant with respect to the position in the original image when the aperture value is not less than the predetermined value.

12. An image processing apparatus capable of generating a restored image from an original image, the image processing apparatus comprising:

an obtaining unit configured to obtain the original image and an image pickup condition of the original image;

a determining unit configured to determine whether an aperture value which is set when the original image is shot is not less than a predetermined value; and an image processing unit configured to generate the restored image from the original image by using an image restoration filter which is different depending on the image pickup condition and on a position in the original image when the aperture value is less than the predetermined value, and by using an image restoration filter whose distribution of two-dimensional filter values is constant with respect to the position in the original image when the aperture value is not less than the predetermined value.

13. An image processing method of generating a restored image from an original image, the image processing method comprising the steps of:

obtaining the original image and an image pickup condition of the original image;

determining whether an aperture value which is set when the original image is shot is not less than a predetermined value; and generating the restored image from the original image by using an image restoration filter which is different depending on the image pickup condition and on a position in the original image when the aperture value is less than the predetermined value, and by using an image restoration filter whose distribution of two-dimensional filter values is constant with respect to the position in the original image when the aperture value is not less than the predetermined value.

14. A non-transitory computer-readable storage medium storing an image processing program to generate a restored image from an original image, the image processing program being configured to cause an information processing apparatus to execute the steps of:

obtaining the original image and an image pickup condition of the original image;

determining whether an aperture value which is set when the original image is shot is not less than a predetermined value; and generating the restored image from the original image by using an image restoration filter which is different depending on the image pickup condition and on a position in the original image when the aperture value is less than the predetermined value, and by using an image restoration filter whose distribution of two-dimensional filter values is constant with respect to the position in the original image when the aperture value is not less than the predetermined value.

* * * * *